(12) United States Patent
Moizard et al.

(10) Patent No.: US 8,738,236 B2
(45) Date of Patent: May 27, 2014

(54) METHOD AND SYSTEM FOR ADJUSTMENT OF HEADLAMPS FOR MOTOR VEHICLES

(75) Inventors: Julien Moizard, Paris (FR); Gregoire Sadoux, Asnieres sur Seine (FR); Jonathan Blandin, Les Pavillons sous Bois (FR)

(73) Assignee: Valeo Vision, Bobigny (FR)

( * ) Notice: Subject to any disclaimer, the term of this patent is extended or adjusted under 35 U.S.C. 154(b) by 19 days.

(21) Appl. No.: 13/299,619

(22) Filed: Nov. 18, 2011

(65) Prior Publication Data
US 2012/0123648 A1    May 17, 2012

Related U.S. Application Data

(63) Continuation of application No. PCT/EP2010/057074, filed on May 21, 2010.

(30) Foreign Application Priority Data

May 25, 2009    (FR) ...................................... 09 53418

(51) Int. Cl.
*B60Q 1/14*    (2006.01)
*B60Q 1/12*    (2006.01)

(52) U.S. Cl.
CPC *B60Q 1/143* (2013.01); *B60Q 1/12* (2013.01); *B60Q 2300/056* (2013.01); *B60Q 2300/41* (2013.01); *B60Q 2300/42* (2013.01)
USPC ............................................ 701/49; 362/466

(58) Field of Classification Search
CPC .... B60Q 1/12; B60Q 1/143; B60Q 2300/056; B60Q 2300/41; B60Q 2300/42
USPC ........................................................... 701/49
See application file for complete search history.

(56) References Cited

U.S. PATENT DOCUMENTS

| | | | | |
|---|---|---|---|---|
| 7,204,620 | B2 * | 4/2007 | Yamamoto et al. | 362/465 |
| 7,374,320 | B2 * | 5/2008 | Horii et al. | 362/466 |
| 8,019,512 | B2 * | 9/2011 | Kamioka et al. | 701/49 |

(Continued)

FOREIGN PATENT DOCUMENTS

| | | |
|---|---|---|
| DE | 102006043281 | 3/2008 |
| DE | 102007045150 | 4/2008 |

(Continued)

OTHER PUBLICATIONS

P.F. Alcantarilla, L.M. Bergasa, P. Jiménez, M.A. Sotelo, I. Parra, D.Fernandez, S.S. Mayoral, "Night Time Vehicle Detection for Driving Assistance LightBeam Controller", Intelligent Vehicles Symposium, IV2008, Eindhoven, Jun. 4-6, 2008, pp. 291-296.

(Continued)

*Primary Examiner* — John R Olszewski
*Assistant Examiner* — Todd Melton
(74) *Attorney, Agent, or Firm* — Jacox, Meckstroth & Jenkins

(57) ABSTRACT

A method and system for adjustment of headlamps for motor vehicles, comprising a step for calculating a headlamp angle. The method furthermore comprises the steps of detecting a target vehicle, calculating a lateral position of the target vehicle with respect to the motor vehicle, calculating a lateral angular offset with respect to the said lateral position of the target vehicle and adjusting the headlamps as a function of the headlamp angle and of the lateral angular offset.

24 Claims, 12 Drawing Sheets

(56) References Cited

U.S. PATENT DOCUMENTS

| | | | |
|---|---|---|---|
| 8,120,652 B2 * | 2/2012 | Bechtel et al. | 348/113 |
| 8,562,192 B2 * | 10/2013 | Tatara | 362/512 |
| 2008/0106886 A1 | 5/2008 | Sugimoto et al. | |
| 2009/0279317 A1 * | 11/2009 | Tatara | 362/465 |

FOREIGN PATENT DOCUMENTS

| | | |
|---|---|---|
| DE | 102007028658 | 12/2008 |
| EP | 1987985 | 11/2008 |
| EP | 2119593 | 11/2009 |
| JP | 2009046118 | 3/2009 |

OTHER PUBLICATIONS

J.Moizard, B.Reiss, "Advance High Beam/Low Beam Transitions: Progressive Beam and Predictive Levelling", authors—Valeo Lighting Systems pp. 4 and 5—submitted to the conference Vision 2008 ref: 2008-02 07/08 Oct. 2008.

* cited by examiner

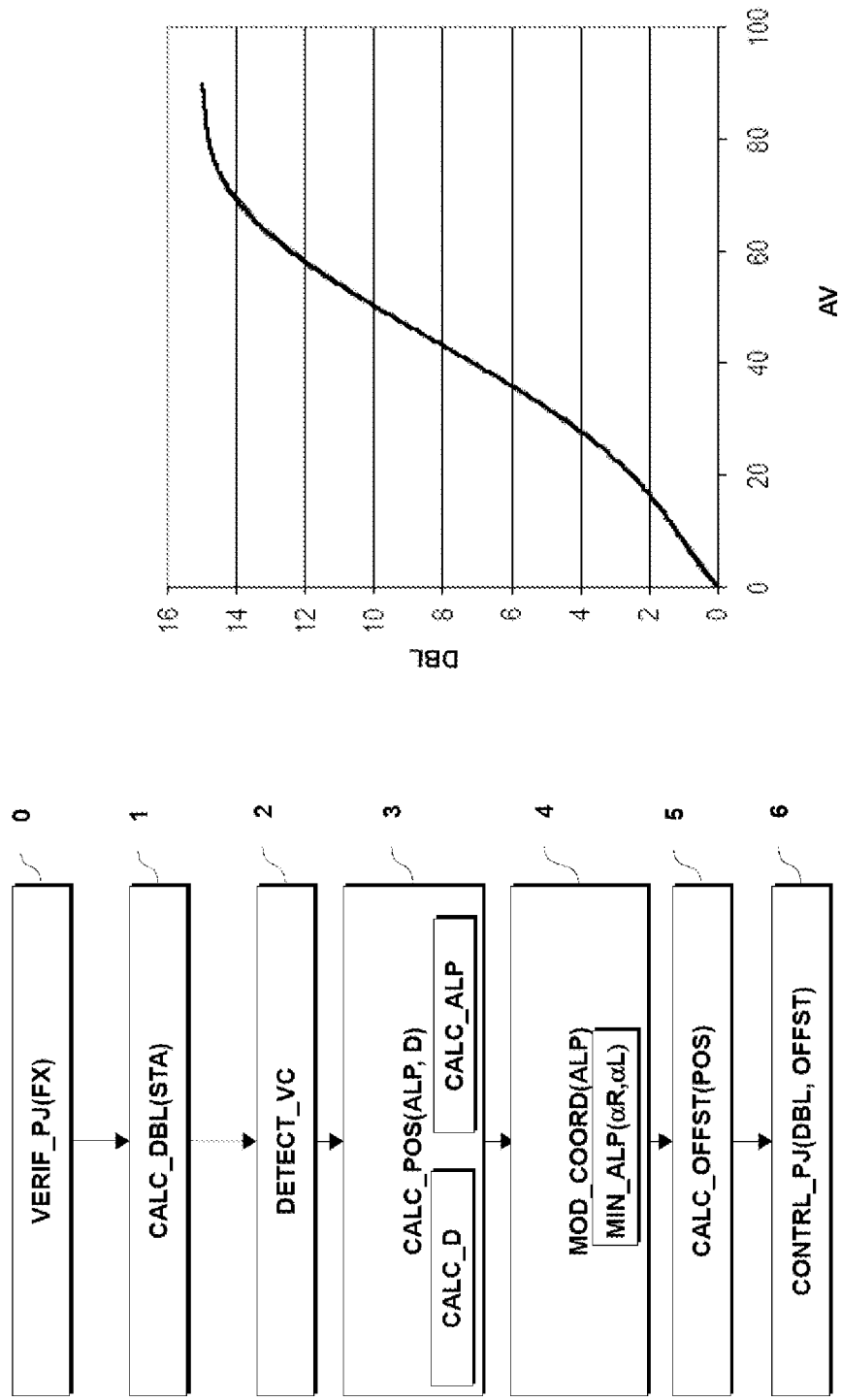

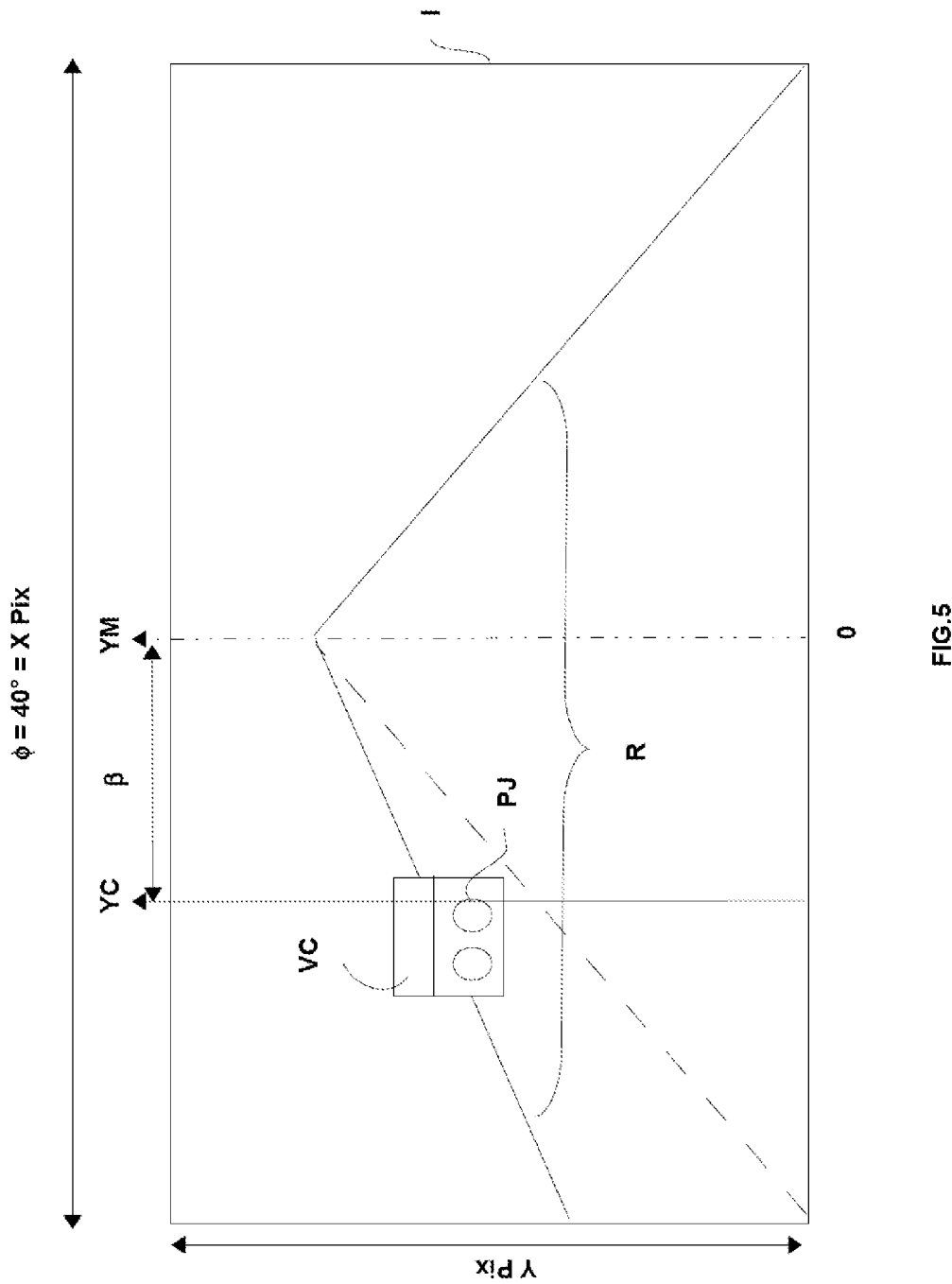

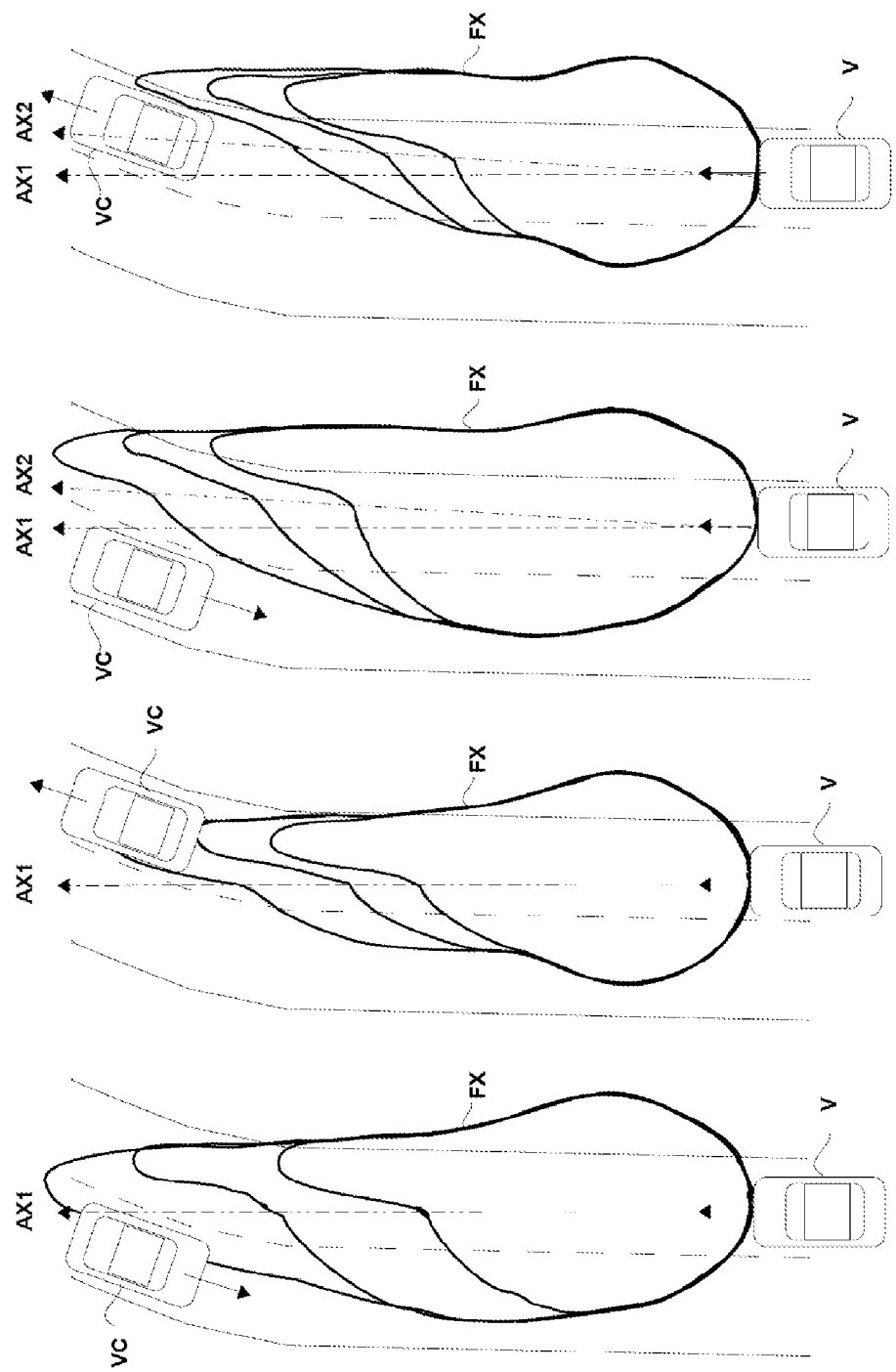

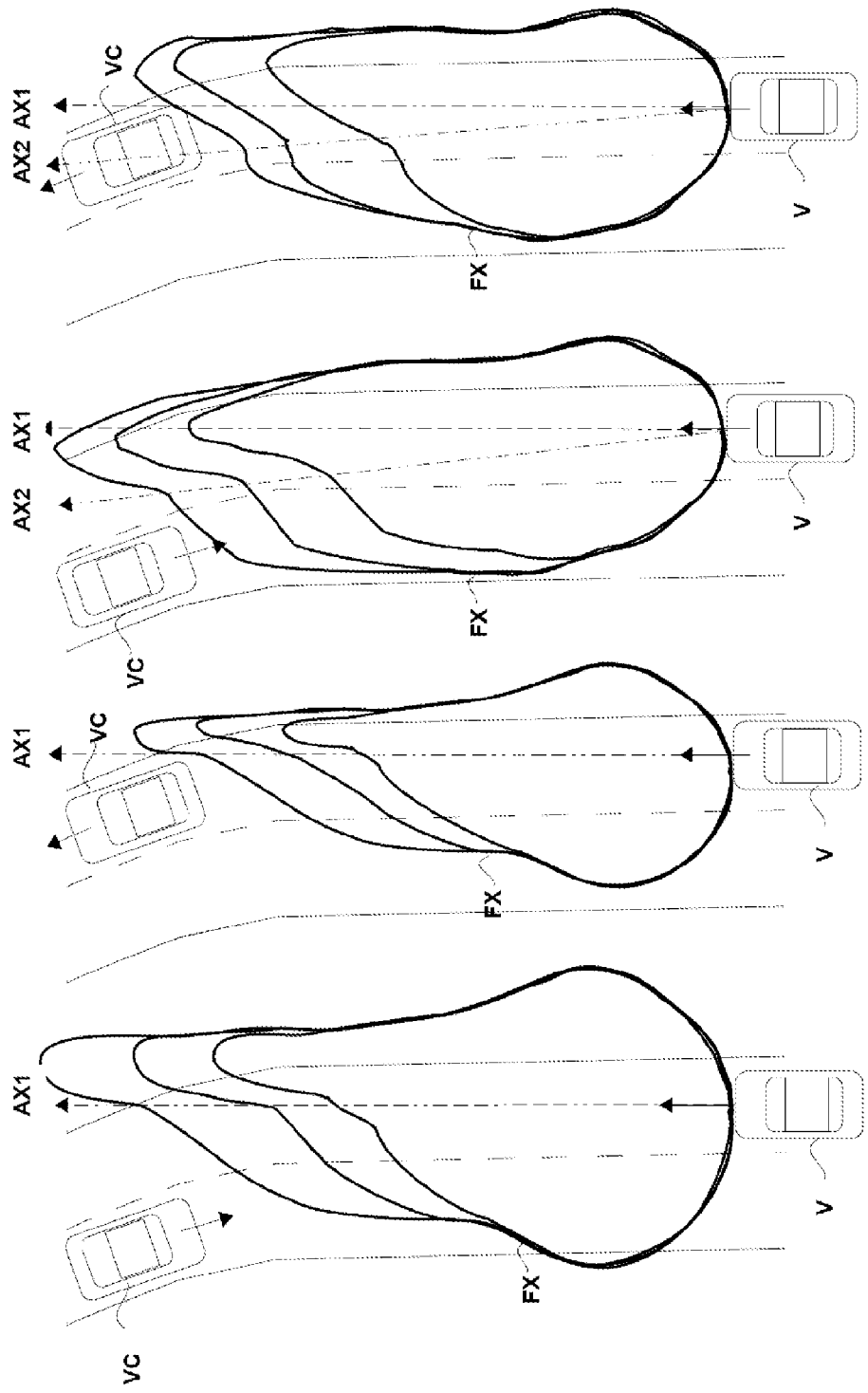

METHOD AND SYSTEM FOR ADJUSTMENT OF HEADLAMPS FOR MOTOR VEHICLES

CROSS-REFERENCE TO RELATED APPLICATIONS

This application is a continuation of International Application No. PCT/EP2010/057074 filed May 21, 2010, which claims the benefit of French Application No. 0953418 filed May 25, 2009.

BACKGROUND OF THE INVENTION

1. Field of the Invention

The present invention relates to a method for adjustment of headlamps for motor vehicles, comprising a step for calculating a headlamp angle. It also relates to a device for implementing the method. It is particularly applicable to the field of motor vehicles.

2. Description of the Related Art

In the field of motor vehicles, a known prior art method for adjustment of headlamps for motor vehicles comprises a step for calculating a headlamp angle in the case where the vehicle engages a bend which allows the path of the vehicle to be obtained.

The method comprises a step for mechanically rotating an optical module installed in the headlamp in such a manner as to laterally shift the cutoff of the beams from the headlamps in order to illuminate the path followed by the vehicle and hence the bend. This is referred to as dynamic adjustment of the headlamps (or "Dynamic Bending Light").

Furthermore, starting from the detection of the target vehicle, another adjustment method for the headlamps comprises a step for masking the beam from the headlamps of the motor vehicle with a shutter moving substantially vertically (or in rotation) so as to vertically displace the cutoff of the beam in order to optimize the illumination of the road.

This is referred to as an adjustment of the beam from the headlamps of the progressive type (or "Progressive Beam"). In this case, the headlamps are therefore used with an increased range of the beams. This progressive beam allows the visibility of the driver of the vehicle in question to be enhanced.

Lastly, another adjustment method comprises a step for using headlamps with increased range of the beams when the headlamps are positioned in "bad weather" low-beam mode (in order to better illuminate the road) or when the headlamps are positioned in "motorway" low-beam mode (in order to illuminate further away). One use of the beams is referred to as AFS (or "Adaptive Front Lighting System") mode with increased range.

One drawback of this prior art system is that the driver of the target vehicle may be adversely affected by the beam with increased range of the motor vehicle in question and may be dazzled when he is in a bend which is about to be engaged by the motor vehicle, and in particular in a right-hand bend.

Furthermore, the U.S. Patent Publication No. 2008/0106886 describes a device for controlling the angle of a headlamp of a vehicle as a function of the curvature of the road, in order to avoid blinding the driver of an oncoming vehicle.

SUMMARY OF THE INVENTION

One goal or object of the present invention is to provide a method and device for adjustment of headlamps for motor vehicles, comprising a step for calculating a headlamp angle, which allows the problem of dazzling the target vehicles to be solved, in particular in the right-hand bends when the beams from the headlamps of the motor vehicle in question are of the progressive type.

According to a first embodiment of the invention, this goal is achieved by a method for adjustment of headlamps for motor vehicles, comprising a step for calculating a headlamp angle, wherein it furthermore comprises the steps of:

detecting a target vehicle;

calculating a lateral position of the target vehicle with respect to the motor vehicle;

calculating a lateral angular offset with respect to the lateral position of the target vehicle; and adjusting the headlamps as a function of the headlamp angle and of the lateral angular offset.

As will be seen in detail hereinbelow, the fact that, in addition to the headlamp angle, the angular offset is used, which takes into account the lateral position of the target vehicle with respect to the motor vehicle in question, will allow the headlamps of the motor vehicle in question to be adjusted more precisely and the cutoff of the beam from the headlamps to be sufficiently offset so that they do not dazzle the target vehicle when it is in a right-hand bend. Furthermore, in left-hand bends, the angular offset to the left will also allow the illumination of the road on which the vehicle in question is travelling to be optimized and hence the visibility of the driver of the vehicle in question to be improved.

According to non-limiting embodiments, the adjustment method can furthermore comprise one or more additional features from amongst the following:

The lateral position of the target vehicle is calculated as a function of a position lateral angle and of a distance of the target vehicle with respect to the motor vehicle. This is a calculation that is straightforward to implement.

The calculation of the lateral angular offset is carried out with respect to the lateral position of the target vehicle and with respect to the headlamp angle. This allows an angular offset not to be applied when the steering wheel of the vehicle is sufficiently rotated such that it does not dazzle a target vehicle or that it already sufficiently illuminates the road.

The calculation of the lateral angular offset is carried out with respect to the lateral position of the target vehicle and with respect to the headlamp angle. This allows an angular offset not to be applied when the steering wheel of the vehicle is sufficiently rotated such that it does not dazzle a target vehicle or that it already sufficiently illuminates the road.

The adjustment method furthermore comprises an additional step for applying a camera-vehicle reference frame change to the position lateral angle. This allows the correct position lateral angle to be calculated with respect to the headlamps of the motor vehicle in question in order to correctly position the headlamps so as not to dazzle a target vehicle.

The adjustment method furthermore comprises an additional step for defining the position lateral angle as being the position lateral angle having the lower value between two position lateral angles defined in two headlamp reference frames coming from the camera-headlamp change of reference frame. This allows a more precise angular offset with respect to the target vehicle to be obtained and hence the illumination to be optimized.

The method furthermore comprises an initial step for verifying if the headlamps of the motor vehicle are in an increased range operational mode of the beam. This avoids having to execute all the steps of the method if the headlamps are used in a standard fashion. Indeed, in this case, there is no risk of dazzling a driver of a target vehicle.

According to a second embodiment of the invention, it also relates to a device for adjustment of headlamps for motor vehicles, comprising an assembly of control units comprising at least one control unit, the assembly being capable of calculating a headlamp angle, wherein the assembly is furthermore capable of:

- detecting a target vehicle;
- calculating a lateral position of the target vehicle with respect to the motor vehicle;
- calculating a lateral angular offset with respect to the lateral position of the target vehicle; and
- controlling an adjustment unit capable of adjusting the headlamps as a function of the headlamp angle and of the lateral angular offset.

According to non-limiting embodiments, the adjustment device can furthermore comprise one or more additional features from amongst the following:

The assembly of control units is furthermore capable of calculating the lateral position of the target vehicle as a function of a position lateral angle and of a distance of the target vehicle with respect to the motor vehicle.

The assembly of control units is furthermore capable of defining the position lateral angle in a camera reference frame as a function of a target light source positioned at one end of the target vehicle, which end corresponds to a type of traffic.

The assembly of control units is furthermore capable of carrying out the calculation of the lateral angular offset with respect to the lateral position of the target vehicle and with respect to the headlamp angle.

The assembly of control units is furthermore capable of applying a camera-vehicle reference frame change to the position lateral angle.

The assembly of control units is furthermore capable of defining the position lateral angle as being the position lateral angle having the lower value between two position lateral angles defined in two headlamp reference frames coming from the camera-headlamp change of reference frame.

The assembly of control units is furthermore capable of verifying if the headlamps of the motor vehicle are in an increased range operational mode of the beam.

According to a third subject of the invention, it relates to a computer program product comprising one or more instruction sequences executable by an information processing unit, the execution of the instruction sequences allowing an implementation of the method according to any one of the preceding features or claims.

The invention and its various applications will be better understood upon reading the description that follows and upon examining the appended figures.

Another embodiment of the invention is a method for adjustment of headlamps (PJ) for motor vehicles (V), comprising a step for calculating a headlamp angle (DBL) determined as a function of the path of the vehicle, for example as a function of an angle of the steering wheel and/or of navigational data such as GPS data, wherein it furthermore comprises the steps of:

- detecting a target vehicle (VC);
- calculating a lateral position (POS) of the target vehicle (VC) with respect to the motor vehicle (V);
- deducing a lateral angular offset (OFFST) as a function of the lateral position (POS) of the target vehicle (VC); and
- adjusting, where necessary, the headlamp or headlamps (PJ) as a function of the headlamp angle (DBL) and of the lateral angular offset (OFFST).

These and other objects and advantages of the invention will be apparent from the following description, the accompanying drawings and the appended claims

BRIEF DESCRIPTION OF THE ACCOMPANYING DRAWINGS

These are only presented by way of non-limiting example of the invention.

FIG. 1 is a flow diagram of one non-limiting embodiment of the adjustment method according to one embodiment of the invention;

FIG. 2 is a curve representative of a headlamp angle with respect to an angle of the steering wheel used by the method in FIG. 1;

FIG. 5 shows an image acquired by a camera of the motor vehicle, the image being used by the adjustment method in FIG. 1;

FIG. 10 illustrates the effects of a headlamp beam of the progressive type from a motor vehicle on an oncoming target vehicle when the motor vehicle is about to engage a right-hand bend, according to an adjustment method of the prior art;

FIG. 11 illustrates the effects of a headlamp beam of the progressive type from a motor vehicle on a target vehicle being followed when the motor vehicle is about to engage a right-hand bend, according to an adjustment method of the prior art;

FIG. 12 illustrates the effects of a headlamp beam of the progressive type from a motor vehicle on an oncoming target vehicle when the motor vehicle is about to engage a right-hand bend, according to the adjustment method in FIG. 1;

FIG. 13 illustrates the effects of a headlamp beam of the progressive type from a motor vehicle on a target vehicle being followed when the motor vehicle is about to engage a right-hand bend, according to the adjustment method in FIG. 1;

FIG. 14 illustrates the effects of a headlamp beam of the progressive type from a motor vehicle on an oncoming target vehicle when the motor vehicle is about to engage a left-hand bend, according to an adjustment method of the prior art;

FIG. 15 illustrates the effects of a headlamp beam of the progressive type from a motor vehicle on a target vehicle being followed when the motor vehicle is about to engage a left-hand bend, according to an adjustment method of the prior art;

FIG. 16 illustrates the effects of a headlamp beam of the progressive type from a motor vehicle on an oncoming target vehicle when the motor vehicle is about to engage a left-hand bend, according to the adjustment method in FIG. 1;

FIG. 17 illustrates the effects of a headlamp beam of the progressive type from a motor vehicle on a target vehicle being followed when the motor vehicle is about to engage a left-hand bend, according to the adjustment method in FIG. 1.

DETAILED DESCRIPTION OF THE PREFERRED EMBODIMENTS

Figure 3:
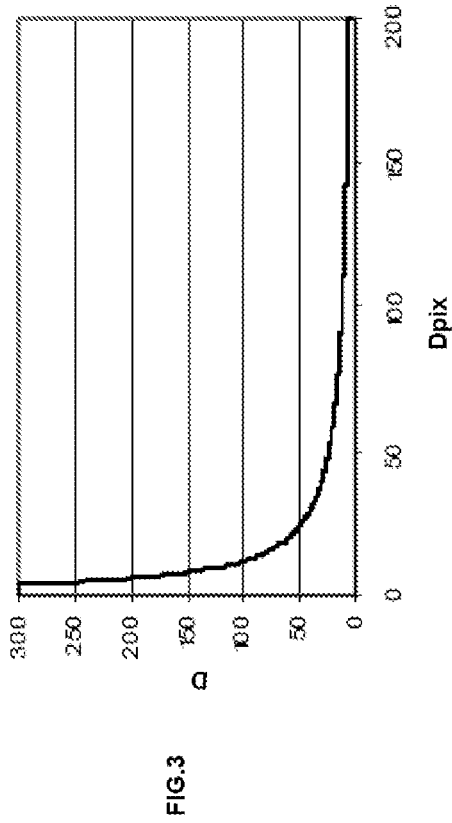
FIG. 3 is a curve for estimation of a distance of a target vehicle with respect to a motor vehicle, used by the method in FIG. 1.

In all the figures, the common elements carry the same reference numbers.

The method for adjustment of headlamps for motor vehicles according to the invention is described in one non-limiting embodiment in FIG. 1. A headlamp is capable of emitting a light beam FX that will henceforth in the description be referred to as beam.

It will be noted that the term 'motor vehicle' is understood to mean any type of motorized vehicle.

The adjustment method comprises the following steps such as illustrated in FIG. 1:
- calculating a headlamp angle DBL (step CALC_DBL (STA));
- detecting a target vehicle VC (step DETECT_VC);
- calculating a lateral position POS of the target vehicle VC with respect to the motor vehicle V (step CALC_POS (ALP; D));
- calculating a lateral angular offset OFFST with respect to the lateral position POS of the target vehicle VC (step CALC_OFFST(POS)); and
- adjusting the headlamps PJ as a function of the headlamp angle DBL and of the lateral angular offset OFFST (step CONTRL_PJ(DBL,OFFST)).

It will be noted that a target vehicle VC is an oncoming vehicle (which is situated in the opposite lane to that of the motor vehicle in question V) or vehicle being followed (which is situated in the same lane as that of the motor vehicle in question V).

According to one non-limiting embodiment, the lateral position POS of the target vehicle VC is calculated as a function of a position lateral angle ALP and of a distance D of the target vehicle VC with respect to the motor vehicle V.

According to one non-limiting embodiment, the adjustment method furthermore comprises an additional step for applying a camera-vehicle reference frame change to the position lateral angle ALP (step MOD_COORD(ALP)).

According to one non-limiting embodiment, the adjustment method furthermore comprises an initial step for verifying if the headlamps PJ of the motor vehicle V are in an increased range operational mode of the beam FX (step VERIF_PJ(FX) illustrated in FIG. 1).

In the following part of the description, in the non-limiting embodiment of the method described, the method comprises these additional steps.

The steps of the method are described in detail hereinafter.

In an initial step 0), it is verified if the headlamps PJ of the motor vehicle V are in an increased range operational mode of the beam FX.

It will be noted that the term 'increased range' signifies that either the beams from the headlamps are used in progressive mode, or they are in AFS mode with increased range (for example in the bad weather low-beam position or in low-beam motorway position).

If this is verified, this signifies that the beams FX from the headlamps PJ are being used with an increased range with respect to a standard range defined by the regulations on headlamps PJ. In one non-limiting example, low-beam headlights have an increased range. In this case, the following steps of the adjustment method described hereinbelow may be carried out.

In the opposite case, this signifies that the headlamps PJ are used in a standard manner, and the following steps of the adjustment method hereinbelow are not carried out.

It will be noted that, when the headlamps PJ are in low-beam position, in one non-limiting embodiment, they are used in standard mode until around a target vehicle distance D of 80-100 meters and are used in increased range mode from about 100 meters and beyond. It will be noted that, in high-beam position, in other words when no vehicle is detected (cf step 2), the beam from a headlamp does not comprise any cutoff.

Of course, this initial step need not be carried out and, in another embodiment, the steps described hereinabove can thus be carried out whatever the range of the beams from the headlamps PJ.

Thus, in this mode, the steps hereinbelow will be carried out when the headlamps PJ are in any given low-beam position, namely standard low beam, motorway low beam, bad weather low beam, with or without increased range.

In a first step 1), a headlamp angle DBL is calculated.

In one non-limiting embodiment, the calculation of the angle headlamp DBL is carried out as a function of an angle of the steering wheel AV.

The angle of the steering wheel AV represents the direction of the wheels of the motor vehicle V with respect to the path of the motor vehicle. This angle of the steering wheel is given in a standard manner by an angular sensor placed in the motor vehicle.

In other variant non-limiting embodiments, the speed of the vehicle V, the speed of the angle of the steering wheel AV, a lateral acceleration of the vehicle V, etc. may additionally be used.

The headlamp angle DBL represents the angle that must be applied to the headlamps PJ of the motor vehicle V to make them swivel in such a manner as to illuminate the path followed by the motor vehicle V.

In one non-limiting embodiment, the headlamp angle DBL is calculated based on the angle of the steering wheel AV in an empirical manner. In one non-limiting example, a reference curve is established which is calculated as a function of the radius of curvature of the bends (linked directly to the angle of the steering wheel AV) so that the light beam from the headlamps PJ is aimed in the direction of the vehicle.

Such a curve can be represented by the following formula:

$$DBL=a*AV^5+b*AV^4+c*AV^3+d*AV^2+d*AV+e$$

The curve is then optimized (by adjusting the coefficients a, b, c, d and e) by vehicle running trials so as to improve the driving comfort. In one non-limiting example the following empirical values for the optimized curve, illustrated in FIG. 2, are thus obtained:

| AV | DBL |
|---|---|
| 0 | 0 |
| 15 | 1.8 |
| 24 | 3.2 |
| 34 | 5.5 |
| 51 | 10.2 |
| 58 | 12 |
| 65 | 13.4 |
| 73 | 14.4 |
| 90 | 15 |

The abscissa represents the values of the angle of the steering wheel AV and the ordinate the values of the headlamp angle DBL.

In a second step 2), a target vehicle VC is detected.

In one non-limiting embodiment, the detection is carried out by means of a camera CAM and according to the recognition of lamps such as the headlamps PJ or the rear lights F of a target vehicle VC.

In one non-limiting example, a known method can be used that is described in the document P. F. Alcantarilla, L. M. Bergasa, P. Jiménez, M. A. Sotelo, I. Parra, D. Fernandez, S. S. Mayoral, "Night Time Vehicle Detection for Driving Assistance LightBeam Controller", Intelligent Vehicles Symposium, IV2008, Eindhoven, Jun. 4-6, 2008, p.p. 291-296, which is incorporated herein by reference and made a part hereof.

Of course, other methods known to those skilled in the art may be used.

In a third step 3), a lateral position POS of the target vehicle VC is calculated with respect to the motor vehicle V.

According to one non-limiting embodiment, the lateral position POS of the target vehicle VC is calculated as a function of a position lateral angle ALP and of a distance D of the target vehicle VC with respect to the motor vehicle V.

As far as the distance D of the target vehicle VC is concerned, according to one non-limiting embodiment, it is calculated according to a method which uses an image I acquired by a camera CAM of the motor vehicle V (sub-step CALC_D illustrated in FIG. 1). According to this method, in a first step, the distance in pixels between two headlamps PJ of a target vehicle VC is estimated according to the curve illustrated in FIG. 3. On the abscissa axis, the distance in pixels Dpix between the two headlamps PJ is shown, and on the ordinate axis the estimated distance D of the target vehicle VC with respect to the motor vehicle V. In a second step, a Kalmann filter is applied so as to smooth the values of the distances obtained over a sequence of images. Such a method is known to those skilled in the art and is described in the article entitled "Advance High Beam/Low Beam Transitions: Progressive Beam and Predictive Leveling", authors J. Moizard, B. Reiss—Valeo Lighting Systems pages 4 and 5—submitted to the conference Vision 2008 ref: 2008 Feb. 7/8 Oct. 2008, which is incorporated herein by reference and made a part hereof.

As far as the position lateral angle ALP is concerned, it defines an angular position of the target vehicles VC in a given reference frame COORD of the motor vehicle V.

In one non-limiting embodiment, this angle ALP is determined by means of a camera CAM. The given reference frame COORD of the motor vehicle V is therefore a camera reference frame COORD_CAM.

Figure 4:
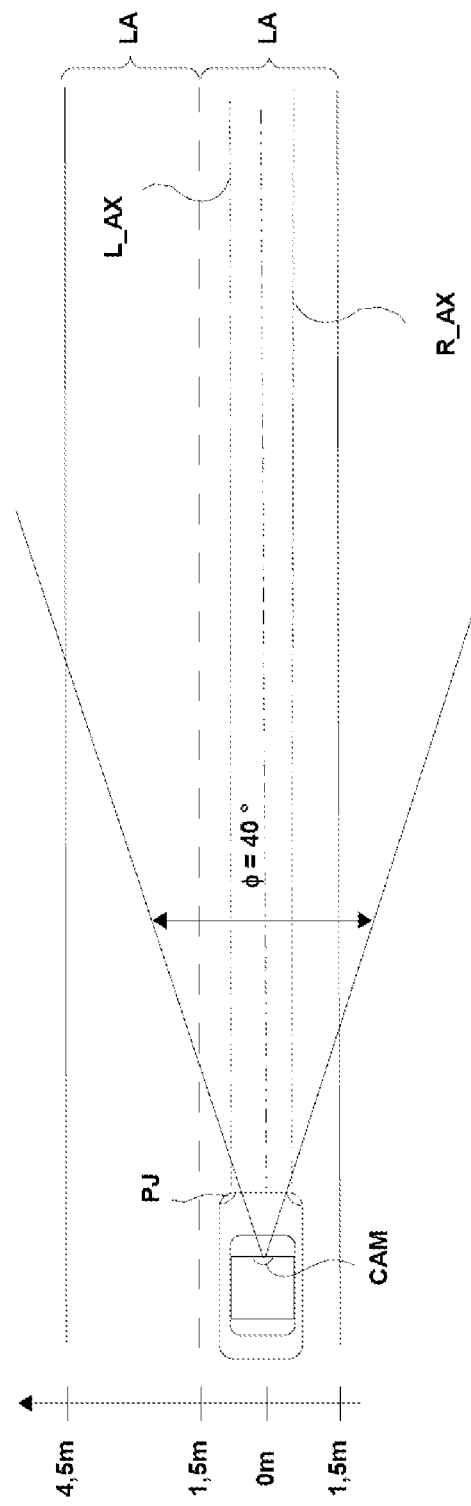
FIG. 4 shows a schematic diagram of a motor vehicle in which a camera angle used by the adjustment method in FIG. 1 is illustrated.

As can be seen in FIG. 4, a motor vehicle V is situated on a road R with two lanes LA. This motor vehicle comprises a camera CAM with opening angle $\phi$ equal to 40° in one non-limiting example.

In FIG. 5, an image I acquired by the camera CAM of the motor vehicle V is shown. The opening angle $\phi$ of the camera is represented by the entire width of the image in pixels Pix.

The position lateral angle ALP is represented here in the camera reference frame COORD_CAM by the reference $\beta$. With respect to the image I acquired by the camera CAM, the position lateral angle $\beta$ is determined by the distance separating an axis on the ordinate YM passing through the center of the image I and an axis YC relating to a lamp of the target vehicle VC that is not to be dazzled.

Figure 6A:
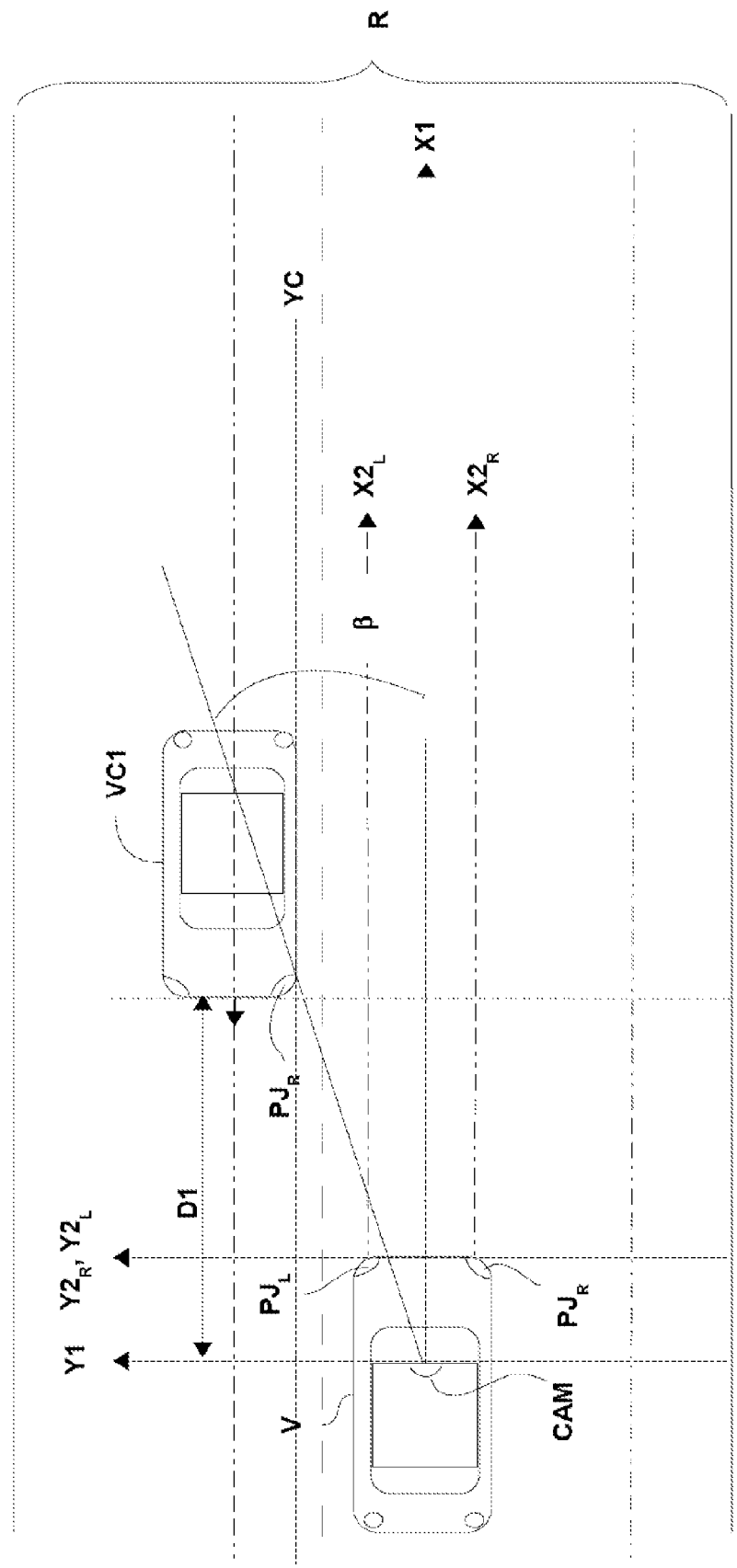
FIGS. 6A, 6B and 6C are explicatory figures for a determination of a position lateral angle carried out by the adjustment method in FIG. 1.

Thus, when only one target vehicle VC is detected, when the target vehicle VC is an oncoming vehicle (hence situated in the lane opposite to that of the motor vehicle in question V), such as illustrated in FIG. 6a, the relative axis YC is defined in the image on the left-hand border of the left headlamp PJ of the oncoming vehicle VC. Thus, the position lateral angle $\beta$ is defined with respect to the left border of the left headlamp of the oncoming vehicle VC. This allows the cutoff of the beam from a headlamp to be positioned to the left of the head of the driver of the oncoming vehicle in order to avoid dazzling him, i.e., on the right in FIG. 5.

Figure 6B:
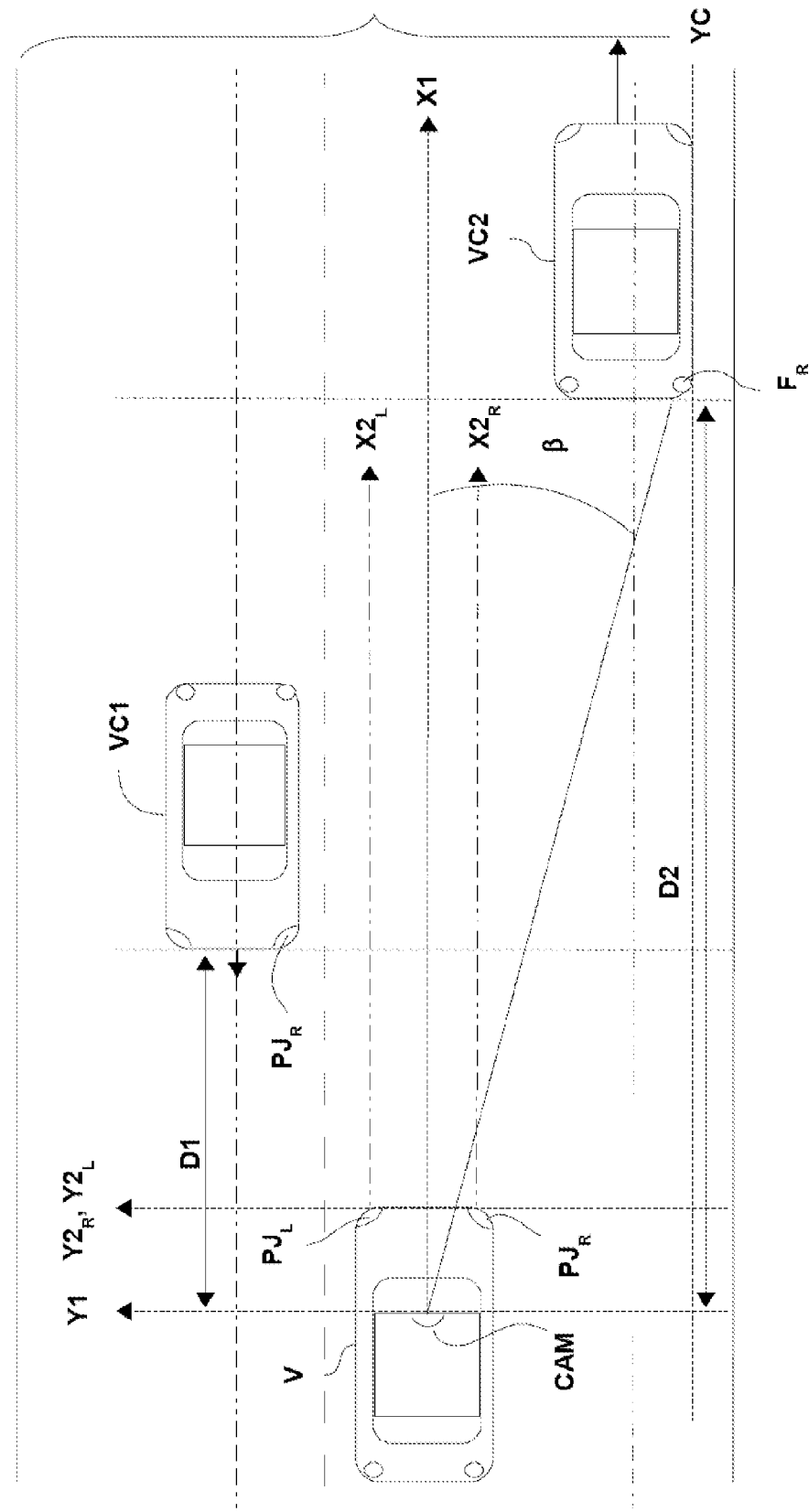

When the target vehicle VC is a vehicle being followed (hence located in the same lane as the motor vehicle in question V), such as illustrated in FIG. 6B, the relative axis YC is defined in the image on the right-hand border of the right-side rear light F of the target vehicle VC. Thus, the position lateral angle $\beta$ is defined with respect to the right-hand border of the rear light of the vehicle being followed VC. This allows the cutoff of the beam from a headlamp to be positioned to the right of the head of the driver of the vehicle being followed in order to avoid dazzling him.

Figure 6C:
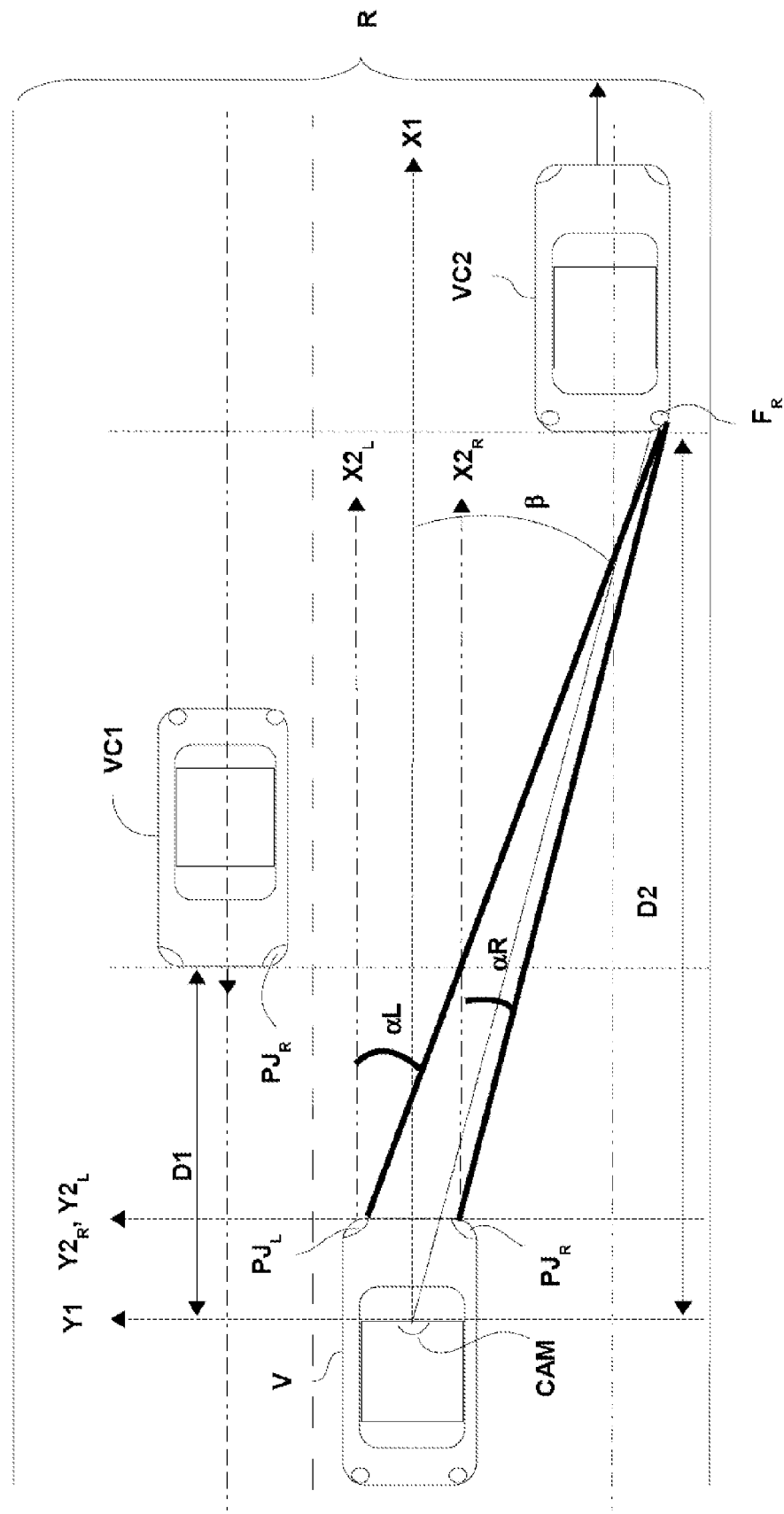

In contrast, when several target vehicles VC are detected, for example an oncoming vehicle VC1 and a vehicle being followed VC2, such as illustrated in FIG. 6c, the relative axis YC is defined in the image on the right-hand border of the right-side rear light F of the target vehicle VC. Thus, the position lateral angle $\beta$ is defined with respect to the right-hand border of the rear light of the vehicle being followed VC. This allows the cutoff of the beam of a headlamp to be positioned to the right of the head of the driver of the vehicle being followed in order to avoid dazzling him. Dazzling a vehicle further to the left, namely an oncoming vehicle in this example, is also avoided.

Thus, whether there be one or more target vehicles VC detected, in one non-limiting embodiment, the position lateral angle ALP is defined in a camera reference frame X1Y1 as a function of a target light source PJ, F positioned at one end of the target vehicle VC, which end corresponds to a type of traffic (right or left) (sub-step CALC_ALP illustrated in FIG. 1). Thus, the light source will be positioned at the right-hand end when there is traffic on the right (such as the traffic in France) and at the left-hand end when there is traffic on the left (such as the traffic in England, in Japan or else in Australia).

As will be seen hereinafter, after having determined the position lateral angle ALP with respect to the camera reference frame, a change of reference frame will be made in order to calculate the position lateral angle ALP in two other vehicle reference frames, namely two headlamp reference frames. This change of reference frame will be made with respect to the target light source positioned at the end on the side of the traffic defined hereinabove.

In a fourth step 4), a camera-headlamp reference frame change is applied to the position lateral angle ALP. This allows the correct position lateral angles ALP to be calculated which will be subsequently used to adjust the headlamps PJ of the motor vehicle V.

The change of reference frame is therefore carried out between a camera reference frame COORD_CAM and two headlamp reference frames COORD_PJ. As described hereinbelow, the camera-headlamp reference frame change uses two headlamp reference frames associated with the headlamps of the vehicle in question V. Two position lateral angles are thus obtained.

Figure 7:
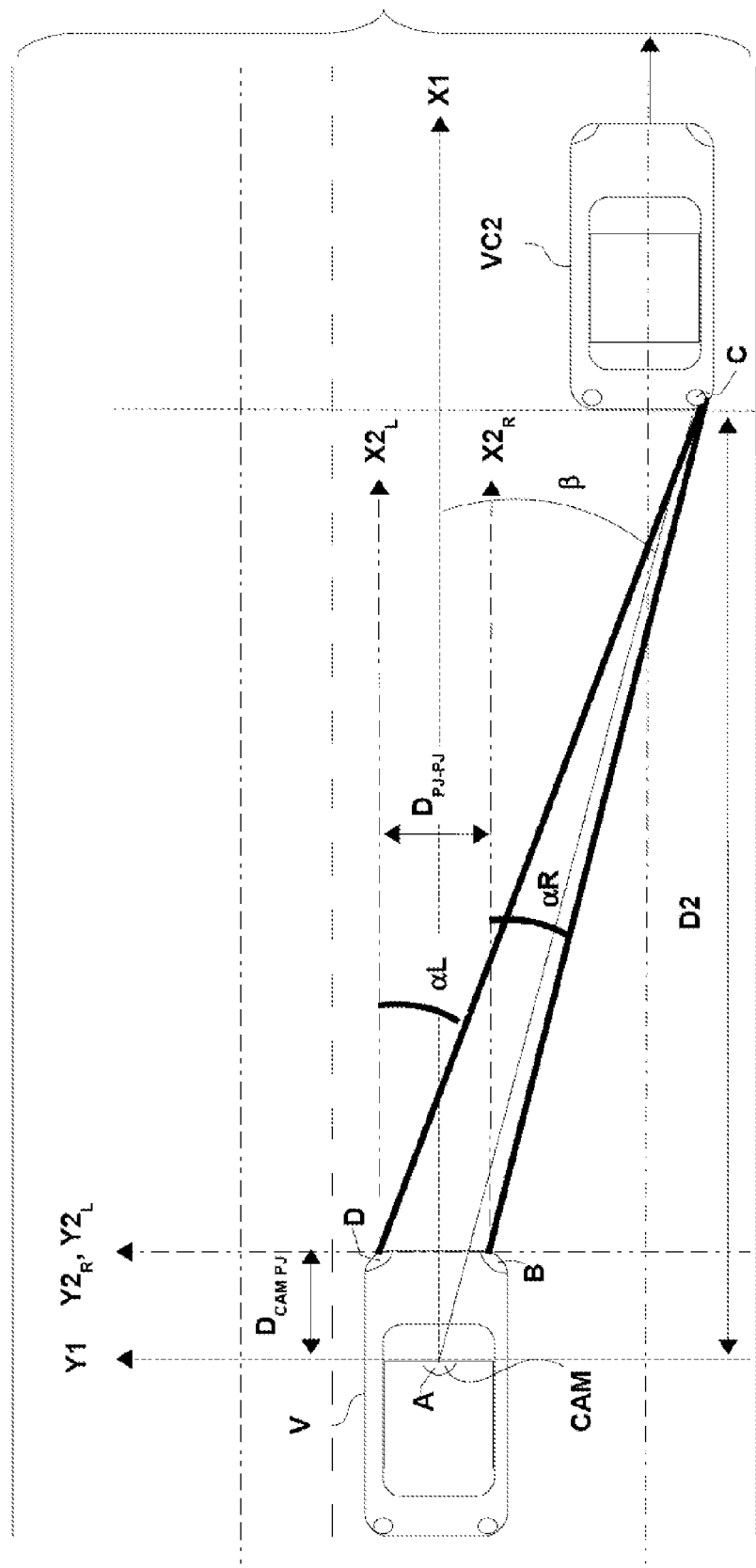
FIGS. 7 and 8 are explicatory figures for a camera-headlamp reference frame change used by the adjustment method in FIG. 1.
Figure 8:
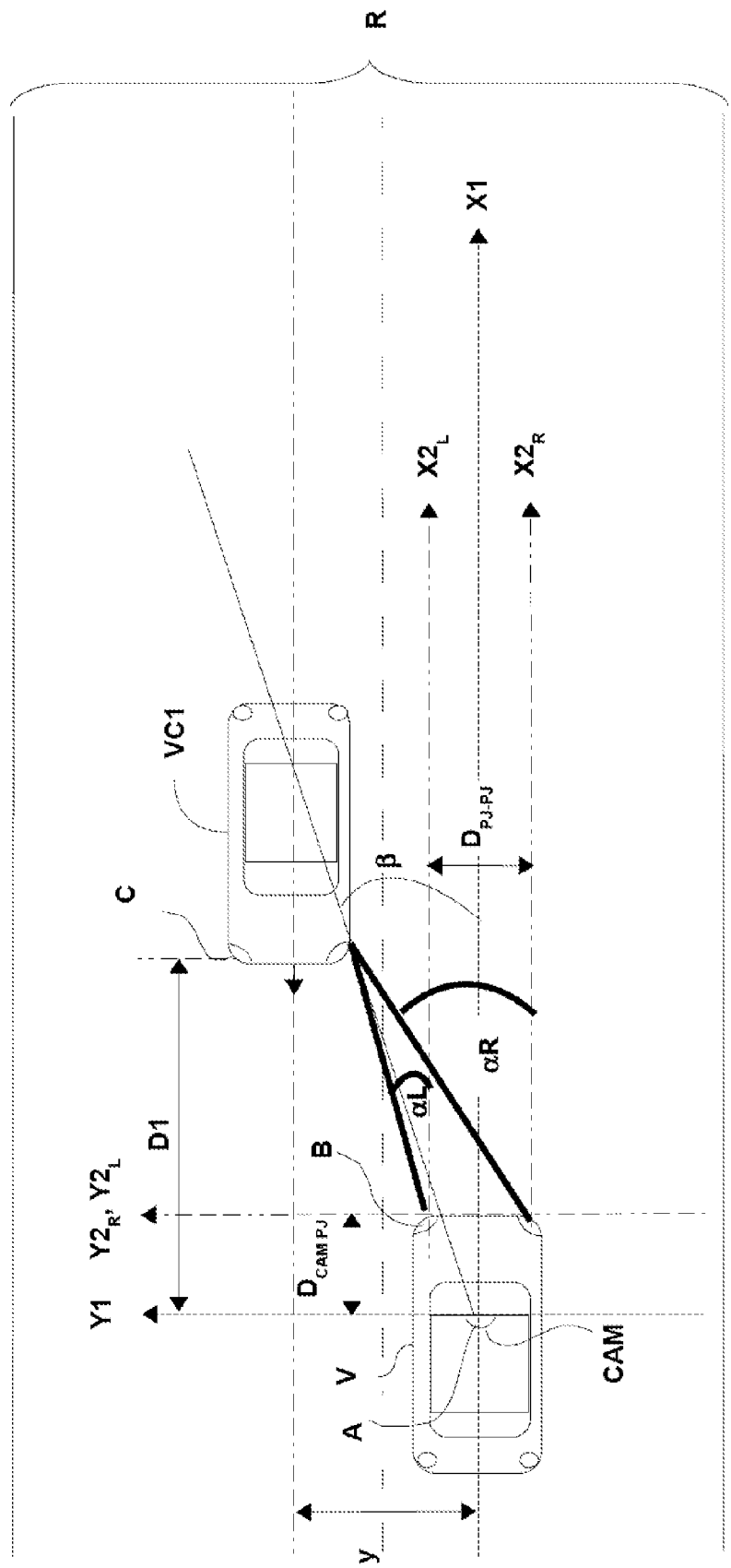

FIGS. 6C, 7 and 8 allow the change of reference frame to be explained.

In FIG. 6C, a motor vehicle V and two target vehicles are illustrated, one of which is an oncoming vehicle VC1 and the other a vehicle being followed VC2 in one non-limiting example of traffic on the right.

The camera reference frame X1Y1 is defined by an abscissa axis X1 passing through the center of the camera CAM and by an ordinate axis Y1 passing through the camera CAM. The position angle ALP in this camera reference frame X1Y1 is defined with respect to the end light source on the traffic side, in other words the right-side end source of the vehicle VC2. In the example in FIG. 6C, this corresponds to the right-side rear light $F_R$ of the target vehicle VC2. As can be seen illustrated in FIG. 6C, it is referenced β.

The camera-headlamp reference frame change is thus carried out with respect to the right-side rear light $F_R$ of the vehicle being followed VC2.

A headlamp reference frame COORD_PJ is associated with each headlamp PJ of the motor vehicle V. Thus, in one non-limiting example, a first headlamp reference frame $X2_R Y2_R$ is associated with the right headlamp $PJ_R$ of the motor vehicle V, and a second headlamp reference frame $X2_L Y2_L$ is associated with the left headlamp $PJ_L$ of the motor vehicle V.

The first headlamp reference frame $X2_R Y2_R$ is defined by an abscissa axis $X2_R$ and by an ordinate axis $Y2_R$ passing through the center of the right headlamp $PJ_R$ represented by the light source.

The second headlamp reference frame $X2_L Y2_L$ is defined by an abscissa axis $X2_L$ and by an ordinate axis $Y2_L$ passing through the center of the left headlamp $PJ_L$ represented by the light source.

Thus, the position lateral angle ALP in the first headlamp reference frame $X2_R Y2_R$ is defined with respect to the abscissa axis $X2_R$ and with respect to the right-side rear light of the vehicle being followed VC2. As can be seen illustrated in FIG. 6C, it is reference $α_R$.

The position lateral angle ALP in the second headlamp reference frame $X2_L Y2_L$ is defined with respect to the abscissa axis $X2_L$ and with respect to the right-side rear light of the vehicle being followed VC2. As can be seen illustrated in FIG. 6C, it is referenced $α_L$.

The change of reference frame with respect to the first headlamp reference frame $X2_R Y2_R$ and to the second headlamp reference frame $X2_L Y2_L$ is described hereinafter.

With Respect to the First Headlamp Reference Frame $X2_R Y2_R$

The change of reference frame with respect to the first headlamp reference frame $X2_R Y2_R$ that will be referred to as right headlamp reference frame is thus carried out in the following manner.

The example is taken of a vehicle being followed VC2, hence travelling in the same direction as that of the motor vehicle in question V, as illustrated in FIG. 7.

The following data values are known:
 the distance D2 to the detected target vehicle VC2 in the camera reference frame X1Y1;
 the position lateral angle β, in the camera reference frame X1Y1;
 the camera headlamp distance $D_{CAMPJ}$; and
 the distance between the headlamps $D_{PJPJ}$ Knowing that tan β=y/D2, with y the distance on the ordinate axis between the motor vehicle V and the target vehicle VC2.

Therefore, y=D2 tan β.

Also, x=X+$D_{CAMPJ}$ and y=Y−$D_{PJPJ}$/2 with x,y coordinates in the camera reference frame; and X,Y coordinates in the right headlamp reference frame.

If the following points are considered:
A: a point situated at the camera CAM;
B: a point situated at the right headlamp of the motor vehicle V; and
C: a point situated at the right-side light of the target vehicle VC2; then, in the camera reference frame X1Y1, the three points have the following coordinates:
A: x=0; y=0
B: x=$D_{CAMPJ}$; y=−$D_{PJPJ}$/2
C: x=D2; y=−D2*tan β

Hence, in the right headlamp reference frame $X2_R Y2_R$, the following coordinates are obtained for the three points:
A: X=−$D_{CAMPJ}$; Y=$D_{PJPJ}$/2
B: X=0; Y=0
C: X=D2−$D_{CAMPJ}$; Y=−(D2*tan β)+$D_{PJPJ}$/2

Hence, the position lateral angle $α_R$ in the right headlamp reference frame X2RY2R is equal to:

Tan($α_R$)=Y/X=(−(D2*tan β)+$D_{PJPJ}$/2))/(D2−$D_{CAMPJ}$)

With Respect to the Second Headlamp Reference Frame $X2_L X2_L$

The change of reference frame with respect to the second headlamp reference frame $X2_L Y2_L$ that will be referred to as left headlamp reference frame is thus carried out in the following manner.

The example is taken of a vehicle being followed VC2, hence travelling in the same direction as that of the motor vehicle in question V, as illustrated in FIG. 7.

The following data values are known:
 the distance D2 to the detected target vehicle VC2 in the camera reference frame X1Y1;
 the position lateral angle β, in the camera reference frame X1Y1;
 the camera headlamp distance $D_{CAMPJ}$; and
 the distance between the headlamps $D_{PJPJ}$ Knowing that tan β=y/D2, with y the distance on the ordinate axis between the motor vehicle V and the target vehicle VC2.

Therefore, y=D2 tan β.

Also, x=X+$D_{CAMPJ}$ and y=Y+$D_{PJPJ}$/2 with x,y coordinates in the camera reference frame; and X,Y coordinates in the right headlamp reference frame.

If the following points are considered:
A: a point situated at the camera CAM;
D: a point situated at the left headlamp of the motor vehicle V; and
C: a point situated at the right-side light $F_R$ of the target vehicle VC2; then, in the camera reference frame X1Y1, the three points have the following coordinates:
A: x=0; y=0
D: x=$D_{CAMPJ}$; y=$D_{PJPJ}$/2
C: x=D2; y=−D2*tan β

Hence, in the left headlamp reference frame $X2_L Y2_L$, the following coordinates are obtained for the three points:
A: X=−$D_{CAMPJ}$; Y=−$D_{PJPJ}$/2
D: X=0; Y=0
C: X=D2−$D_{CAMPJ}$; Y=−(D2*tan β)−$D_{PJPJ}$/2

Hence, the position lateral angle $α_R$ in the right headlamp reference frame $X2_R Y2_R$ is equal to:

Tan($α_R$)=Y/X=(−(D2*tan β)−$D_{PJPJ}$/2))/(D2−$D_{CAMPJ}$)

Thus, two position lateral angles $α_R$ and $α_L$, respectively, are obtained in the right headlamp reference frame $X2_R Y2_R$ and the left headlamp reference frame $X2_L Y2_L$, respectively.

It will be noted that the calculations carried out hereinabove are applicable to a case where an oncoming vehicle and a vehicle being followed are detected such as illustrated in FIG. 6c seen previously.

It will furthermore be noted that the same type of calculations can be applied in the case of an oncoming vehicle VC1 only, hence travelling in the lane opposite to that of the motor vehicle in question V, as illustrated in FIG. 8.

In a fifth step 5), a lateral angular offset OFFST is calculated with respect to the lateral position POS of the target vehicle VC.

In one non-limiting embodiment, the calculation of the angular offset OFFST is carried out with respect to the lateral position POS of the target vehicle VC and to the headlamp angle DBL, and in particular with respect to:
- the target vehicle distance D; and
- the difference between the headlamp angle DBL and the position lateral angle ALP.

Indeed, it is pointless to increase the headlamp angle DBL with an additional angular offset OFFST if the orientation of the headlamps PJ is greater than the position lateral angle ALP in the case of a right-hand bend, and is smaller in the case of a left-hand bend.

In these cases, the light beam from the headlamp PJ is not dazzling.

Thus, if D_ALP_DBL=DBL−ALP>0, OFFST=0 in the case of a right-hand bend, otherwise OFFST≠0.

If D_ALP_DBL=DBL−ALP<0, OFFST=0 in the case of a left-hand bend, otherwise OFFST≠0.

It will be noted that taking the target vehicle distance D into account allows the calculation of the lateral angular offset OFFST to be optimized.

In one non-limiting embodiment, the position lateral angle ALP=$\alpha$ used in the lateral position POS is defined as being the position lateral angle $\alpha$ having the lower value between the two angles $\alpha_R$ and $\alpha_L$ defined previously in the headlamp reference frames. This allows the least dazzling angular offset to be obtained from between the two available ones that are associated with the two angles $\alpha_R$ and $\alpha_L$ (sub-step MIN_ALP ($\alpha_R$, $\alpha_L$) illustrated in FIG. 1).

According to one non-limiting embodiment, the angular offset OFFST is calculated with respect to the lateral position POS in an empirical manner.

Initial curves are obtained based on static tests representing the driving situations in question, as a function of the glare observed for each situation. The offset is sought that allows the glare to be eliminated. The operation is repeated for several values of distance and of angle DBL.

Depending on the variabilities of the light beam from the headlamps PJ, (the cutoff sharpness, the maximum light intensity, etc.), the glare will be more or less noticeable and hence intrusive.

Figure 9B:
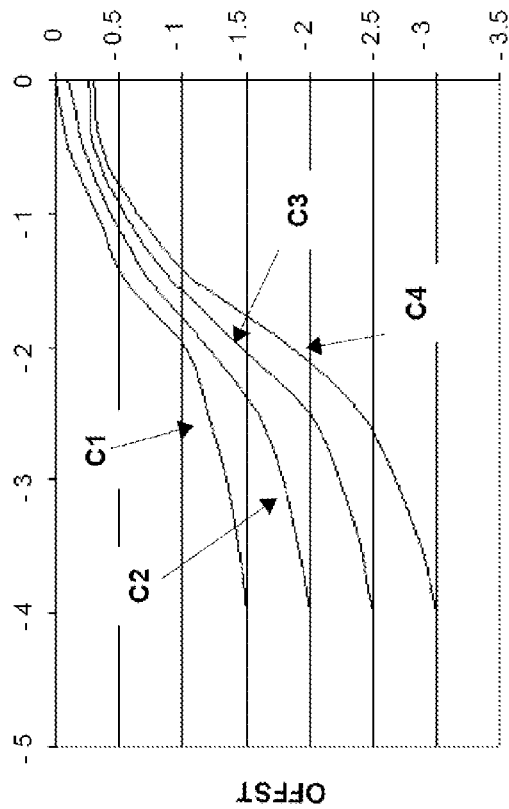
FIG. 9B illustrates a curve representative of a lateral angular offset with respect to a position lateral angle used by the adjustment method in FIG. 1, in the case of a left-hand bend.
Figure 9A:
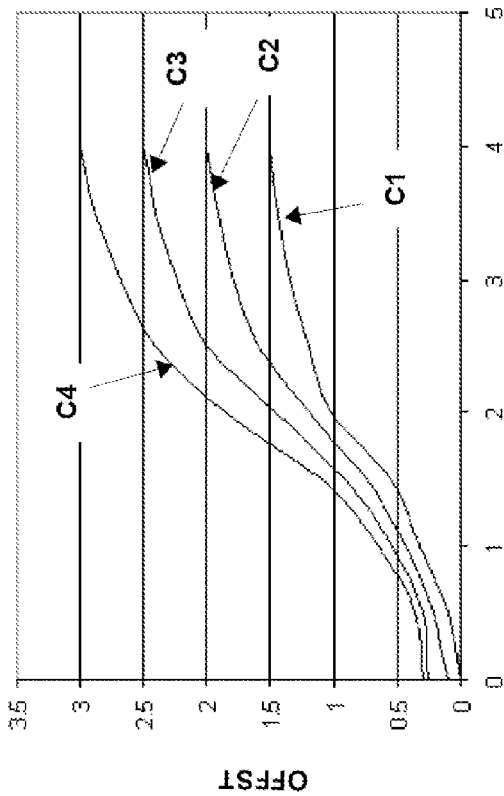
FIG. 9A illustrates a curve representative of a lateral angular offset with respect to a position lateral angle used by the adjustment method in FIG. 1, in the case of a right-hand bend.

In one non-limiting example, the curves illustrated in FIG. 9A for a right-hand bend and illustrated in FIG. 9B for a left-hand bend are thus obtained (starting from the initial curves) in an empirical manner.

For the four curves C4, C3, C2, C1, the abscissa is the delta D_POS_DBL between:
- the position lateral angle ALP calculated previously in a headlamp reference frame COORD_PJ; and
- the headlamp angle DBL and the ordinate is the angular offset OFFST.

Each curve C4, C3, C2, C1 thus allows the lateral angular offset OFFST to be determined for the target vehicle distances D 300 meters, 250 meters, 200 meters and 100 meters, respectively.

It goes without saying that, for obtaining curves at different distances, for example at a distance of 150 meters, the same empirical method can be applied.

The following formula representative of the curves is obtained:

for a right-hand bend $$OFFST=A*D*(a*D\_ALP\_DBL^5+b*D\_ALP\_DBL^4+c*D\_ALP\_DBL^3+d*D\_ALP\_DBL^2+e*D\_ALP\_DBL+f).$$

for a left-hand bend $$OFFST=A*D*(a*D\_ALP\_DBL^5-b*D\_ALP\_DBL^4+c*D\_ALP\_DBL^3-d*D\_ALP\_DBL^2+e*D\_ALP\_DBL-f).$$

With D the distance to the target vehicle.

It will be noted that the curves will be adjusted (by varying the coefficients A, a, b, c, d, e, f) during the calibrated driving tests for evaluating the glare.

In a sixth step 6), the headlamps PJ are adjusted as a function of the headlamp angle DBL and of the lateral angular offset OFFST.

Thus, in one non-limiting embodiment, the lateral angular offset OFFST is added to the headlamp angle DBL. This allows the headlamps PJ of the motor vehicle in question V to be adjusted according to an overall offset taking into account not only the curve of the bend that will be engaged by the motor vehicle V (via the headlamp offset DBL), but also the lateral position of the target vehicle VC in the bend (via the lateral angular offset OFFST).

It will be noted that, in one non-limiting embodiment, the lateral angular offset OFFST that is added takes into account the limit of movement of the moveable part of the headlamps (namely the mechanical module comprising the lens of a headlamp).

Thus, the method described allows the headlamps PJ of a motor vehicle V to be adjusted in such a manner as:
- not to dazzle a target vehicle and, in particular, when the latter is located in a right-hand bend which will be engaged by the motor vehicle V; and
- to optimize the illumination of the vehicle V and hence to improve the visibility of the driver of the vehicle V when the vehicle is about to engage a left-hand bend.
- and, where applicable, when the headlamps PJ are in an increased range operational mode of the beams (in progressive mode or in AFS mode). Thus, this allows the cutoff of the beams from the headlamps PJ to be displaced to the right for a right-hand bend or to the left for a left-hand bend.

FIGS. 10 and 11 illustrate situations from the prior art, where the target vehicle VC is an oncoming vehicle or a vehicle being followed, respectively, in the case of a right-hand bend. As can be seen, the beam FX is too bright for the driver of the target vehicle VC. The cutoff of the beams FX is situated on the axis AX1 shown in FIGS. 10 and 11.

FIGS. 12 and 13 illustrate a situation where the adjustment method according to the invention is implemented, when the target vehicle VC is an oncoming vehicle or a vehicle being followed, respectively, in the case of a right-hand bend. As can be seen, the beam FX is no longer too bright for the driver of the target vehicle VC. The cutoff of the beams FX is situated on the axis AX2 shown in FIGS. 12 and 13.

FIGS. 14 and 15 illustrate situations from the prior art, where the target vehicle VC is an oncoming vehicle or a vehicle being followed, respectively, in the case of a left-hand bend. As can be seen, the beam FX is not too bright for the driver of the target vehicle VC. The cutoff of the beams FX is situated on the axis AX1 shown in FIGS. 14 and 15.

FIGS. 16 and 17 illustrate a situation where the adjustment method according to one embodiment of the invention is implemented, when the target vehicle VC is an oncoming vehicle or a vehicle being followed, respectively, in the case of a left-hand bend. As can be seen, the beam FX is still not too bright for the driver of the target vehicle VC. On the other hand, the illumination is optimized because the beam FX illuminates the road better than in the preceding cases. The cutoff of the beams FX is situated on the axis AX2 shown in FIGS. 16 and 17.

The method of the invention is implemented by a device DISP for adjustment of the headlamps PJ for a motor vehicle V (shown in FIG. 18 in one non-limiting embodiment), comprising an assembly of control units UCS comprising at least one control unit UC, the assembly being capable of calculating a headlamp angle DBL.

This device DISP is integrated into the motor vehicle V.

In one non-limiting embodiment, the assembly of control units UCS is furthermore capable of:
 detecting a target vehicle VC;
 calculating a headlamp angle DBL;
 calculating a lateral position POS of the target vehicle VC with respect to the motor vehicle V;
 calculating a lateral angular offset OFFST with respect to the lateral position of the target vehicle VC; and
 controlling an adjustment unit ACT capable of adjusting headlamps PJ as a function of the headlamp angle DBL and of the lateral angular offset OFFST, and notably the moveable part MOD of the headlamps PJ.

In non-limiting embodiments, a control unit UC may be included within the camera CAM, within an adjustment unit ACT, within the headlamps PJ, within a lighting function control processor of the vehicle or else within a vehicle computer ECU.

In a first variant embodiment, the assembly UCS comprises a single control unit UC.

In a second variant embodiment, the assembly UCS comprises a plurality of control units UC.

Thus, the control units UC may be distributed within the camera CAM, within an adjustment unit ACT, within the headlamps PJ, within a lighting function control processor of the vehicle or else within a vehicle computer ECU.

Figure 18:
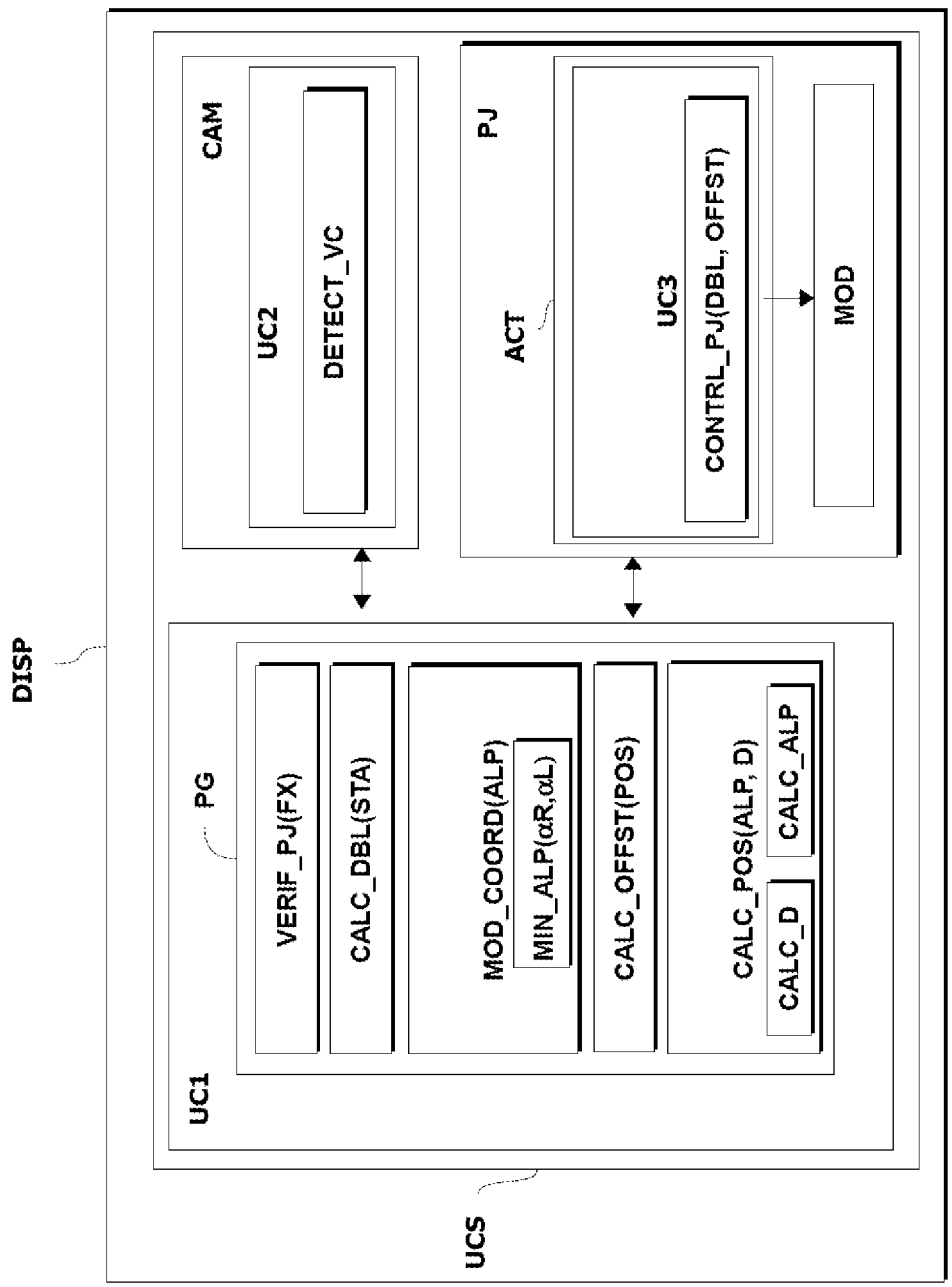
FIG. 18 is a functional block diagram of one non-limiting embodiment of an architecture of an adjustment device implemented according to the method in FIG. 1.

Thus, in one non-limiting embodiment of this second variant, such as illustrated in FIG. 18, the assembly of control units UCS comprises:
 A first control unit UC1 capable of:
  calculating a headlamp angle DBL;
  calculating a lateral position POS of the target vehicle VC with respect to the motor vehicle V;
  calculating a lateral angular offset OFFST with respect to the lateral position of the target vehicle VC.
 A second control unit UC2, also called detection unit, capable of:
  detecting a target vehicle VC;
 A third control unit UC3 capable of:
  controlling an adjustment unit ACT capable of adjusting headlamps PJ as a function of the headlamp angle DBL and of the lateral angular offset OFFST, and notably the moveable part MOD of the headlamps PJ.

In the non-limiting example of FIG. 18, the functions for detection and adjustment of the headlamps are thus respectively distributed within a camera CAM and the headlamps PJ.

Alternatively, it is of course also possible to combine the third control unit UC with the first control unit UC.

In one non-limiting embodiment, the adjustment device DISP furthermore comprises at least one headlamp PJ capable of supplying the light beam. The integration of the device (notably the control unit and the detection unit) is then carried out simultaneously during the installation of the headlamp PJ on the vehicle.

In non-limiting embodiments, the adjustment unit ACT can be:
 an actuator that is widely used for implementing the beam function DBL previously described in the prior art. It allows the whole of the moveable part of the headlamp PJ to be moved. In a manner known to those skilled in the art, such an actuator is electromechanical and is associated with each headlamp of the motor vehicle V or with both headlamps PJ;
 a moveable shutter allowing the beams from the headlamps to be laterally masked in such a manner as to laterally shift the cutoff of the beams; or else
 a device combining modules associated with the light sources allowing the beam to be created from a headlamp. In one non-limiting example, these sources are LEDs.

In non-limiting embodiments, the assembly UCS of control units UC of the adjustment device DISP is furthermore capable of:
 calculating the lateral position POS of the target vehicle VC as a function of a position lateral angle ALP and of a distance D of the target vehicle VC with respect to the said motor vehicle V;
 defining the position lateral angle ALP in a camera reference frame X1Y1 as a function of a target light source PJ, F positioned at one end of the target vehicle VC, which end corresponds to a type of traffic;
 applying a camera-headlamp reference frame change to the position lateral angle ALP; and
 defining the position lateral angle ALP as being the position lateral angle having the lower value between two position lateral angles $\alpha_R, \alpha_L$ defined in two headlamp reference frames $X_R Y_R, X_L Y_L$ coming from the camera-headlamp change of reference frame.

In one non-limiting embodiment, the assembly UCS of control units UC of the adjustment device DISP is furthermore capable of verifying if the headlamps PJ of the motor vehicle V are in an increased range operational mode of the beam FX.

As previously described, the beams FX are used in increased range mode when the headlamps are in progressive mode or in AFS mode ("bad weather" low beam or "motorway low beam" in non-limiting examples).

In one non-limiting embodiment, the camera CAM is of the VGA or WVGA type and allows images of respective size 640*480 pixels or 852*480 pixels to be acquired. In one non-limiting example, the opening angle $\phi$ is equal to 40°. Other types of cameras with other characteristics may of course be used.

It will be noted that the implementation of the adjustment method disclosed hereinabove can be carried out by means of a "software" programmed micro-device, a cabled logic and/or "hardware" electronic components.

Thus, the adjustment device DISP can comprise one or more computer program products PG comprising one or more instruction sequences executable by an information processing unit such as a microprocessor, or by a processing unit of a microcontroller, by an ASIC, by a computer, etc., the execution of the sequences of instructions allowing the method described to be implemented.

Such a computer program PG may be written into a writable non-volatile memory of the ROM type or in a re-writable non-volatile memory of the EEPROM or FLASH type. The computer program PG may be written at the factory or else loaded into memory or remotely downloaded into memory. The sequences of instructions may be sequences of machine instructions, or else sequences of a high-level language interpreted by the processing unit at the time of their execution.

In the non-limiting example in FIG. 18, the computer program PG is written into a memory of the control unit UC of the device DISP.

It goes without saying that the invention is not limited to the embodiments and examples described hereinabove. Thus, the explanations given hereinabove have been described in the case of traffic on the right, but may of course be transposed to traffic on the left.

Thus, the invention presents the following advantages:

It is straightforward to implement;

It avoids the need for additional components since it allows an actuator already present to be used in a standard manner in the vehicles using the progressive beam function;

It prevents the driver of a target vehicle from being dazzled when beams of the progressive type are used and, in particular, in situations where the motor vehicle in question is engaging a bend on which the target vehicle is situated, and this is possible due to the fact that the lateral position of the target vehicle is taken into account;

It allows the lateral angular offset to be taken into account in a precise manner, thanks to the camera-headlamp reference frame change;

It also allows the lateral angular offset to be taken into account in a precise manner thanks to the fact that the type of target vehicle, which is detected, is taken into account and hence thanks to the application of a specific camera-headlamp reference frame change (left headlamp reference frame or right headlamp reference frame);

It prevents a driver of a target vehicle from being dazzled, in a right-hand bend, in the case where the headlamps are used in DBL mode only or else in low-beam position without increased range. This allows any discomfort suffered by the eyes of the driver of a target vehicle to be reduced, notably when the headlamps of the vehicle in question are positioned fairly high up on the vehicle (case of 4×4 vehicles for example);

It allows the illumination of the road to be optimized and hence the visibility of the driver of the vehicle to be improved in the case of left-hand bends;

Where applicable, it avoids the need to execute the calculations of the headlamp angle DBL, of the lateral position POS of the target vehicle and of the angular offset OFFST if the headlamps are utilised in a standard manner, thanks to the initialization step;

It is adaptable to headlamps using any given type of light sources, such as sources using halogen lamps, Xenon lamps, or else LEDs.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A method for adjustment of headlamps (PJ) for motor vehicles (V), comprising a step for calculating a headlamp angle (DBL) determined as a function of the path of the vehicle, said function comprising at least one of an angle of a steering wheel or GPS navigation data, wherein said method furthermore comprises the steps of:

detecting a position of a lamp of a target vehicle (VC) using a camera;

calculating a lateral position (POS) of said target vehicle (VC) with respect to said motor vehicle (V) using said detected position of said lamp of said target vehicle (VC);

deducing a lateral angular offset (OFFST) as a function of said lateral position (POS) of said target vehicle (VC); and adjusting, where necessary, the headlamp or headlamps (PJ) as a function of the headlamp angle (DBL) and of said lateral angular offset (OFFST);

wherein the calculation of said lateral angular offset (OFFST) is carried out as a function of said lateral position (POS) of said target vehicle (VC) and with respect to said headlamp angle (DBL).

2. The method for adjustment according to claim 1, wherein said lateral position (POS) of said target vehicle (VC) is calculated as a function of a position lateral angle (ALP) and of a distance (D) of said target vehicle (VC) with respect to said motor vehicle (V).

3. The method for adjustment according to claim 2, wherein said method furthermore comprises an additional step for defining said position lateral angle (ALP) in a camera reference frame (X1Y1) as a function of a target light source (PJ, F) positioned at one end of said target vehicle (VC).

4. The method for adjustment according to claim 2, wherein said method furthermore comprises an initial step for verifying if said headlamps (PJ) of said motor vehicle (V) are in an increased range operational mode of a beam.

5. The method for adjustment according to claim 1, wherein said method furthermore comprises an initial step for verifying if said headlamps (PJ) of said motor vehicle (V) are in an increased range operational mode of a beam.

6. A computer program product (PG) comprising one or more instruction sequences executable by an information processing unit, the execution of said one or more instruction sequences allowing an implementation of the method according to claim 1.

7. A method for adjustment of headlamps (PJ) for motor vehicles (V), comprising a step for calculating a headlamp angle (DBL) determined as a function of the path of the vehicle, said function comprising at least one of an angle of a steering wheel or GPS navigation data, wherein said method furthermore comprises the steps for:

detecting a target vehicle (VC);

calculating a lateral position (POS) of said target vehicle (VC) with respect to said motor vehicle (V);

deducing a lateral angular offset (OFFST) as a function of said lateral position (POS) of said target vehicle (VC); and adjusting, where necessary, the headlamp or headlamps (PJ) as a function of the headlamp angle (DBL) and of said lateral angular offset (OFFST);

wherein the calculation of said lateral angular offset (OFFST) is carried out as a function of said lateral position (POS) of said target vehicle (VC) and with respect to said headlamp angle (DBL);

wherein said method furthermore comprises an additional step for applying a headlamp-camera reference frame change to a position lateral angle (ALP) in order to obtain a value of said position lateral angle (ALP) in a headlamp reference frame.

8. The method for adjustment according to claim 7, wherein said method furthermore comprises an additional step for defining said position lateral angle (ALP) as being the position lateral angle having the lower value between two position lateral angles ($\alpha_R, \alpha_L$) defined in two headlamp reference frames ($X_R Y_R, X_L Y_L$).

9. The method for adjustment according to claim 7, wherein said method furthermore comprises an initial step for verifying if said headlamps (PJ) of said motor vehicle (V) are in an increased range operational mode of a beam.

10. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
- detecting a position of a lamp of a target vehicle (VC) using a camera;
- calculating a lateral position (POS) of said target vehicle (VC) with respect to said motor vehicle (V) using said detected position of said lamp of said target vehicle (VC);
- deducing a lateral angular offset (OFFST) as a function of said lateral position of said target vehicle (VC);
- controlling an adjustment unit (ACT) capable of adjusting said headlamps (PJ) as a function of said headlamp angle (DBL) and of said lateral angular offset (OFFST); and
- calculating said lateral angular offset (OFFST) with respect to said lateral position (POS) of said target vehicle (VC) and with respect to said headlamp angle (DBL).

11. The device for adjustment according to claim 10, wherein said assembly of control units (UCS) is furthermore capable of calculating said lateral position (POS) of said target vehicle (VC) as a function of a position lateral angle (ALP) and of a distance (D) of said target vehicle (VC) with respect to said motor vehicle (V).

12. The device for adjustment according to claim 11, wherein said assembly of control units (UCS) is furthermore capable of defining said position lateral angle (ALP) in a camera reference frame (X1Y1) as a function of a target light source (PJ, F) positioned at one end of said target vehicle (VC).

13. The device for adjustment according to claim 10, wherein said assembly of control units (UCS) is furthermore capable of verifying if said headlamps (PJ) of said motor vehicle (V) are in an increased range operational mode of a beam.

14. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
- detecting a target vehicle (VC);
- calculating a lateral position (POS) of said target vehicle (VC) with respect to said motor vehicle (V);
- deducing a lateral angular offset (OFFST) as a function of said lateral position of said target vehicle (VC);
- controlling an adjustment unit (ACT) capable of adjusting said headlamps (PJ) as a function of said headlamp angle (DBL) and of said lateral angular offset (OFFST); and
- calculating said lateral angular offset (OFFST) with respect to said lateral position (POS) of said target vehicle (VC) and with respect to said headlamp angle (DBL),
- wherein said assembly of control units (UCS) is furthermore capable of calculating said lateral position (POS) of said target vehicle (VC) as a function of a position lateral angle (ALP) and of a distance (D) of said target vehicle (VC) with respect to said motor vehicle (V);
- wherein said assembly of control units (UCS) is furthermore capable of applying a camera-headlamp reference frame change to said position lateral angle (ALP) so as to obtain a value of said position lateral angle (ALP) in a headlamp reference frame.

15. The device for adjustment according to claim 14, wherein said assembly of control units (UCS) is furthermore capable of defining said position lateral angle (ALP) as being the position lateral angle having the lower value between two position lateral angles ($\alpha_R, \alpha_L$) defined in two headlamp reference frames ($X_R Y_R, X_L Y_L$).

16. A method for adjustment of headlamps (PJ) for motor vehicles (V), comprising a step for calculating a headlamp angle (DBL) determined as a function of the path of the vehicle, said function comprising at least one of an angle of a steering wheel or GPS navigation data, wherein said method furthermore comprises the steps for:
- detecting a target vehicle (VC);
- calculating a lateral position (POS) of said target vehicle (VC) with respect to said motor vehicle (V);
- deducing a lateral angular offset (OFFST) as function of said lateral position (POS) of said target vehicle (VC); and
- adjusting, where necessary, the headlamp or headlamps (PJ) as a function of the headlamp angle (DBL) and of said lateral angular offset (OFFST);
- wherein the calculation of said lateral angular offset (OFFST) is carried out as a function of said lateral position (POS) of said target vehicle (VC) and with respect to said headlamp angle (DBL);
- wherein said lateral position (POS) of said target vehicle (VC) is calculated as a function of a position lateral angle (ALP) and of a distance (D) of said target vehicle (VC) with respect to said motor vehicle (V);
- wherein said method furthermore comprises an additional step for applying a headlamp-camera reference frame change to said position lateral angle (ALP) in order to obtain a value of said position lateral angle (ALP) in a headlamp reference frame.

17. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
- detecting a target vehicle (VC);
- calculating a lateral position (POS) of said target vehicle (VC) with respect to said motor vehicle (V);
- deducing a lateral angular offset (OFFST) as a function of said lateral position of said target vehicle (VC);
- controlling an adjustment unit (ACT) capable of adjusting said headlamps (PJ) as a function of said headlamp angle (DBL) and of said lateral angular offset (OFFST); and
- calculating said lateral angular offset (OFFST) with respect to said lateral position (POS) of said target vehicle (VC) and with respect to said headlamp angle (DBL);
- wherein said assembly of control units (UCS) is furthermore capable of calculating said lateral position (POS) of said target vehicle (VC) as a function of a position lateral angle (ALP) and of a distance (D) of said target vehicle (VC) with respect to said motor vehicle (V);
- wherein said assembly of control units (UCS) is furthermore capable of defining said position lateral angle (ALP) in a camera reference frame (X1Y1) as a function of a target light source (PJ, F) positioned at one end of said target vehicle (VC);
- wherein said assembly of control units (UCS) is furthermore capable of applying a camera-headlamp reference frame change to said position lateral angle (ALP) so as to obtain a value of said position lateral angle (ALP) in a headlamp reference frame.

18. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
   detecting a target vehicle (VC);
   calculating a lateral position (POS) of said target vehicle (VC) with respect to said motor vehicle (V);
   deducing a lateral angular offset (OFFST) as a function of said lateral position of said target vehicle (VC);
   controlling an adjustment unit (ACT) capable of adjusting said headlamps (PJ) as a function of said headlamp angle (DBL) and of said lateral angular offset (OFFST); and
   calculating said lateral angular offset (OFFST) with respect to said lateral position (POS) of said target vehicle (VC) and with respect to said headlamp angle (DBL);
   wherein said assembly of control units (UCS) is furthermore capable of applying a camera-headlamp reference frame change to a position lateral angle (ALP) so as to obtain a value of said position lateral angle (ALP) in a headlamp reference frame.

19. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
   means for detecting a position of a lamp of a target vehicle (VC) using a camera;
   means for calculating a lateral position (POS) of said target vehicle (VC) with respect to said motor vehicle (V) using said detected position of said lamp of said target vehicle (VC);
   means for deducing a lateral angular offset (OFFST) as a function of said lateral position of said target vehicle (VC); and
   means for controlling an adjustment unit (ACT) capable of adjusting said headlamps (PJ) as a function of said headlamp angle (DBL) and of said lateral angular offset (OFFST);
   wherein the calculation of said lateral angular offset (OFFST) is carried out as a function of said lateral position (POS) of said target vehicle (VC) and with respect to said headlamp angle (DBL).

20. The device for adjustment according to claim 19, wherein said assembly of control units (UCS) is furthermore capable of calculating said lateral position (POS) of said target vehicle (VC) as a function of a position lateral angle (ALP) and of a distance (D) of said target vehicle (VC) with respect to said motor vehicle (V).

21. The device for adjustment according to claim 20, wherein said assembly of control units (UCS) is furthermore capable of defining said position lateral angle (ALP) in a camera reference frame (X1Y1) as a function of a target light source (PJ, F) positioned at one end of said target vehicle (VC).

22. The device for adjustment according to claim 19, wherein said assembly of control units (UCS) is furthermore capable of verifying if said headlamps (PJ) of said motor vehicle (V) are in an increased range operational mode of a beam.

23. A device for adjustment (ACT) of headlamps for motor vehicles, comprising an assembly of control units (UCS) comprising at least one control unit (UC), said assembly of control units being capable of calculating a headlamp angle (DBL) as a function of a path of said motor vehicle, wherein said assembly of control units is furthermore capable of:
   means for detecting a target vehicle (VC);
   means for calculating a lateral position (POS) of said target vehicle (VC) with respect to said motor vehicle (V), wherein the calculation of said lateral angular offset (OFFST) is carried out as a function of said lateral position (POS) of said target vehicle (VC) and with respect to said headlamp angle (DBL);
   means for deducing a lateral angular offset (OFFST) as a function of said lateral position of said target vehicle (VC); and
   means for controlling an adjustment unit (ACT) capable of adjusting said headlamps (PJ) as a function of said headlamp angle (DBL) and of said lateral angular offset (OFFST);
   wherein said assembly of control units (UCS) is furthermore capable of calculating said lateral position (POS) of said target vehicle (VC) as a function of a position lateral angle (ALP) and of a distance (D) of said target vehicle (VC) with respect to said motor vehicle (V);
   wherein said assembly of control units (UCS) is furthermore capable of applying a camera-headlamp reference frame change to said position lateral angle (ALP) so as to obtain a value of said position lateral angle (ALP) in a headlamp reference frame.

24. A device for adjustment (ACT) of headlamps for motor vehicles, comprising at least one control unit (UC), said device being capable of calculating a headlamp angle (DBL) as a function of a path of said motor vehicle, wherein said device is furthermore capable of:
   said at least one control unit detecting a position of a lamp of a target vehicle (VC) and calculating a lateral position (POS) of said target vehicle (VC) with respect to said motor vehicle (V) using said detected position of said lamp of said tar et vehicle (VC);
   said at least one control unit further deducing a lateral angular offset (OFFST) as a function of said lateral position of said target vehicle (VC) and controlling an adjustment unit (ACT) capable of adjusting said headlamps (PJ) as a function of said headlamp angle (DBL) and of said lateral angular offset (OFFST);
   wherein said at least one control unit calculates said lateral position (POS) of said target vehicle (VC) as a function of a position lateral angle (ALP) and of a distance (D) of said target vehicle (VC) with respect to said motor vehicle (V);
   wherein the calculation of said lateral angular offset (OFFST) is carried out as a function of said lateral position (POS) of said target vehicle (VC) and with respect to said headlamp angle (DBL).

* * * * *